(No Model.)

C. E. CHRISMAN.
FRUIT DRIER.

No. 497,308.                              Patented May 16, 1893.

Witnesses
O. W. Johnson
S. Brashears

Inventor
C. E. Chrisman
per T. M. Baldwin
Attorney

THE NORRIS PETERS CO., PHOTO-LITHO., WASHINGTON, D. C.

UNITED STATES PATENT OFFICE.

CAMPBELL E. CHRISMAN, OF THE DALLES, OREGON.

FRUIT-DRIER.

SPECIFICATION forming part of Letters Patent No. 497,308, dated May 16, 1893.

Application filed May 17, 1892. Serial No. 433,340. (No model.)

*To all whom it may concern:*

Be it known that I, CAMPBELL E. CHRISMAN, a citizen of the United States, residing at The Dalles, in the county of Wasco and State of Oregon, have invented certain new and useful Improvements in Fruit-Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to "driers for fruits" and has for its object to furnish a fruit drier economical in construction and in consumption of fuel, easy and effective in operation and not liable to get out of order.

With this object in view, my invention consists in the improved construction, arrangement, and combination of parts hereinafter fully described, and afterward specifically pointed out in the subjoined claim.

Figures 1, 2:
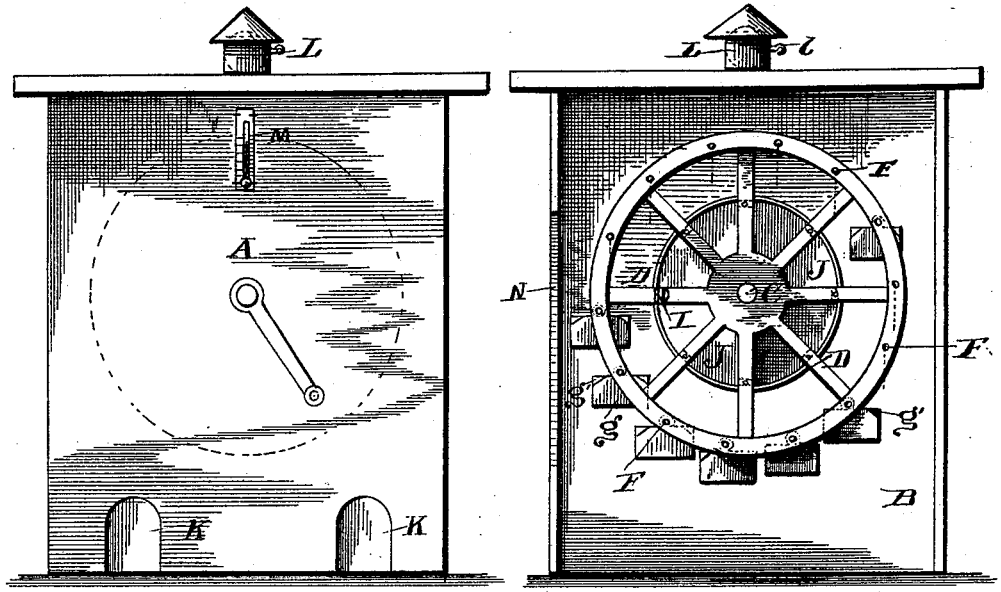
Figures 3, 4:
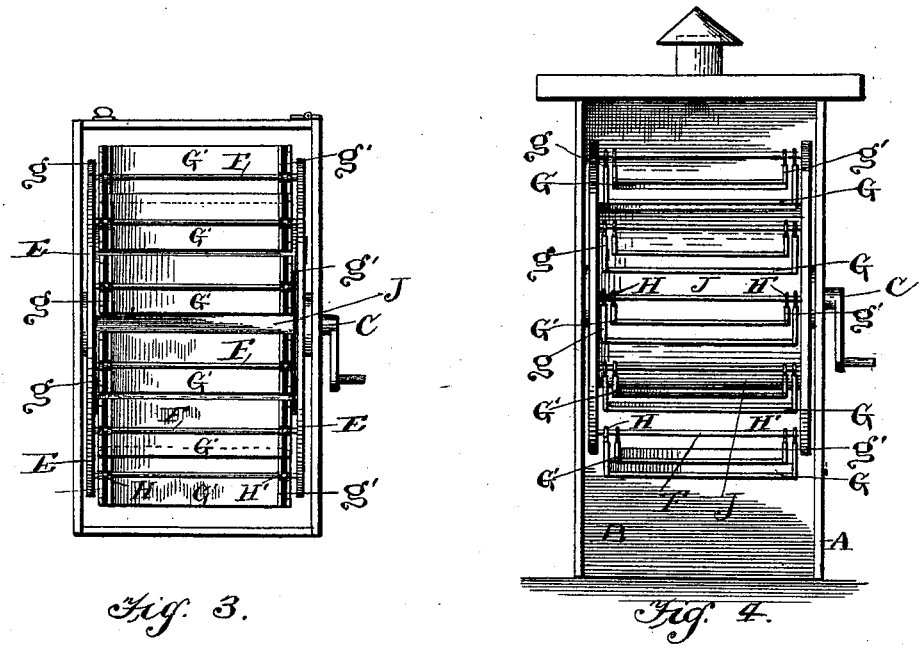

In the drawings Figure 1 is a front elevation of a fruit drier made in accordance with my invention. Fig. 2 is a view of the same with the front removed to show the construction and arrangement of the interior. Fig. 3 is a top plan view with the top removed and Fig. 4 is a side elevation with the side removed to show the construction of the reel and arrangement of the trays.

Like letters of reference mark the same parts wherever they occur in the various figures of the drawings.

Referring to the drawings by letter, A is the front of the drier, and B the rear thereof, which are preferably formed to receive and support bearings for the journals of a central shaft C upon which is constructed the drying reel. This reel consists of two parallel sets of spokes D. D'. connected at their outer ends by means of two rims E. E'. Each set of spokes is equal in number and each individual spoke is arranged opposite its fellow of the other set. In the rims E. E'. are secured cross-rods F arranged at suitable and uniform distances apart. Upon these cross-bars are hung the fruit receiving trays G. G'. as shown. The trays G. G'. are in form similar, but different in size, the trays G' being shorter than the trays G. Both trays of each pair (there being as many pairs as there are pairs of spokes in the reel) are loosely suspended on the cross-rods F by means of eyes H. H'. which are secured in the upturned end flanges $g$. $g'$. of the trays G. G'. and swing thereon as the reel revolves so as always to maintain the proper position to hold the fruit upon them. The tray G being longer than the tray G', its flanges are outside the flanges $g'$ and as the tray G' must hang above the tray G, the flanges $g'$ are made shorter than the flanges $g$, the arrangement being such that the trays will normally be parallel with each other, but capable of independent movement and adjustment, for the purpose of clearing, or during the operation of placing the fruit upon or removing it from them.

About midway between the inner and outer ends of each pair of spokes D. D', is secured a cross-bar I and to said cross bars is secured a drum J.

Within the lower portion of the drier casing is arranged a furnace or furnaces K and its top is provided with a ventilating flue L, having a damper $l$, which afford a means of egress for the steam and vapors arising from the fruit during the process of drying.

Within a suitable opening in the front of the drier casing is set a thermometer M to indicate the temperature of the drier.

At one end the drier casing is provided with a door N furnishing access to the interior thereof for the purpose of introducing and removing the fruit, for cleaning, repairs, &c. The reel may be revolved either by hand or power, as desired.

By arranging the trays in pairs one above the other, as described, pieces of fruit varying in size can be dried uniformly, the larger pieces being placed on the trays G and the smaller pieces being placed on the trays G', whereby the heat comes more directly in contact with the larger pieces, and the large and small pieces are thus equally dried in the same space of time. The trays G and G' are independently movable upon the cross-rods to facilitate the loading and unloading of the trays with fruit, it being possible to tilt or adjust one of the trays in each set without disturbing the other. As the reel revolves, carrying with it the trays G, G', the drum J acts as a deflector, causing the heat in its ascent to pass up both sides of the drier distributing the heat equally about the trays, thus securing uniformity in the dried product.

What I claim is—

In a fruit drier, the combination with the drier casing, of the rotary reel provided at or near its periphery with cross-rods, and trays arranged in pairs and independently suspended from said cross-rods, two trays on each rod one above the other, the said trays being provided with upturned end flanges, the lower tray of each pair being longer than the upper tray and its end flanges being higher than the end flanges of the upper tray, substantially as shown and described.

In testimony whereof I affix my signature in presence of two witnesses.

CAMPBELL E. CHRISMAN.

Witnesses:
A. R. THOMPSON,
FRANK MENEFEE.